(12) United States Patent
Tsai et al.

(10) Patent No.: US 6,486,977 B1
(45) Date of Patent: Nov. 26, 2002

(54) SCANNER WITH A BUILT-IN MICROCONTROLLER

(75) Inventors: Tony Tsai, Hsinchu (TW); Albert Huang, Hsinchu (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/240,852

(22) Filed: Feb. 1, 1999

(30) Foreign Application Priority Data

May 18, 1998 (TW) ..................................... 87207679 U

(51) Int. Cl.[7] ................................................. H04N 1/04
(52) U.S. Cl. ...................... 358/474; 358/442; 358/468; 710/129
(58) Field of Search ................................. 358/474, 442, 358/468, 482, 483, 484; 710/129; 348/552, 220, 207

(56) References Cited

U.S. PATENT DOCUMENTS

| | | | | |
|---|---|---|---|---|
| 4,475,161 A | * | 10/1984 | Stock | ........................ 364/521 |
| 5,742,407 A | * | 4/1998 | Albrecht et al. | ............ 358/496 |
| 5,790,278 A | * | 8/1998 | Ehrne et al. | ................ 358/496 |
| 5,956,158 A | * | 9/1999 | Pinzarrone et al. | ......... 358/474 |
| 5,970,220 A | * | 10/1999 | Bolash et al. | ................ 395/114 |
| 6,049,083 A | * | 4/2000 | Heukensfelt | ........... 250/363.04 |

* cited by examiner

Primary Examiner—Thomas D. Lee
(74) Attorney, Agent, or Firm—Crowel & Moring LLP

(57) ABSTRACT

A scanner with a built-in microcontroller is provided for decreasing the delay of transmission. The scanner includes: an image-picking device for picking digital data of a plurality of image lines, a microcontroller electrically connected to the image-picking device for continuously detecting whether the image-picking device is ready to scan a second image line after a first image line is picked and send out a digital data which have been picked, and an interface device electrically connected to the image-picking device and a universal serial bus (USB) for receiving the digital data sent out by the image-picking device and transmitting the digital data to a data processing device through the USB.

3 Claims, 3 Drawing Sheets

SCANNER WITH A BUILT-IN MICROCONTROLLER

FIELD OF THE INVENTION

The present invention relates to a scanner with a built-in microcontroller to decrease the delay of transmission.

BACKGROUND OF THE INVENTION

A scanner has become a very popular peripheral equipment of the computer. Generally, a scanner is connected with a personal computer (PC) by using a printer port or an interface card now. Please refer to FIG. 1 which is a conventional scanner 11 connected with the PC 13 by the printer port 12. FIG. 2 is a flowchart showing a scanning process of the scanner 11 connected with the PC 13 through the printer port 12. When the PC 13 sends a scanning required signal for starting the scanner 11, a scanning process will be carried out. During the scanning process, the PC 13 is continuously detecting whether the scanner 11 is ready to scan the second image line after the first image line has been scanned. If the scanner 11 is not ready, the PC 13 will keep detecting until the scanner 11 is ready for scanning the next image line and sending out the scanning data to the PC 13.

Currently, various kinds of peripheral equipment of the computer are getting more and more, e.g. mouse, joystick, printer, and monitor, all of which have become indispensable and have their own interfaces. Therefore, the universal serial bus (USB) is developed for solving the problems of connection and usage. The USB is adapted to connect all kinds of peripheral equipment which is in conformity with the USB standards. Of course, the scanner can also be connected with the computer through the USB. Please refer to FIG. 3 which is a block diagram of the conventional scanner 31 which is in conformity with USB standards and is connected with the PC 33 by the USB 32. FIG. 4 is a timing diagram of the signal transmission of the scanner 31 connected with the PC 33 through the USB 32. Basically, the transmission way of the USB is to send all received signals at the time point of every frame. As shown in FIG. 4, the length of each frame is $10^{-3}$s. When the PC 33 generates a scanning required signal at the time point A, however, the USB 32 does not send the scanning required signal to the scanner 31 immediately, but send it with other signals generated by other peripheral equipment, connected with the USB 32 in series, at time point of frame 1. However, depending on the priority of signals, the scanning required signal sometimes is delayed to be sent at the time point of the frame 2. If the scanner 31 is ready to scan a first line segment until the time point B, the response signal of the scanner 31 to the PC 33 through the USB 32 will be delayed to be sent at the time point of the frame 3. Then, the command signal of the scanner 31 for scanning a next image line and sending back the scanning data from the scanner 31 to the PC 33 will be delayed to be sent at the time point of the frame 4.

Because of the characteristic of the USB 32, the signal transmission will be delayed (as shown in FIG. 4). It brings about an increase in the scanning time and influences the efficiency. The main purpose of the present invention is to develop a more efficient scanner by using a built-in microcontroller to improve the drawbacks as discussed above.

SUMMARY OF THE INVENTION

An object of the present invention is to provide a scanner with a built-in microcontroller to decrease the delay of transmission. The scanner includes: an image-picking device for picking digital data of a plurality of image lines, a microcontroller electrically connected to the image-picking device for continuously detecting whether the image-picking device is ready to scan a second image line after a first image line is picked and send out digital data which have been picked, and an interface device of a USB electrically connected to the image-picking device and a universal serial bus (USB) for receiving the digital data sent out by the image-picking device and transmitting the digital data to a data processing device through the USB for further processes.

In accordance with one aspect of the present invention, the image-picking device is a charge-coupled device (CCD).

In accordance with another aspect of the present invention, the data processing device is a personal computer (PC).

The present invention may best be understood through the following description with reference to the accompanying drawings, in which:

DETAILED DESCRIPTION OF THE PREFERRED EMBODIMENTS

Figure 1:
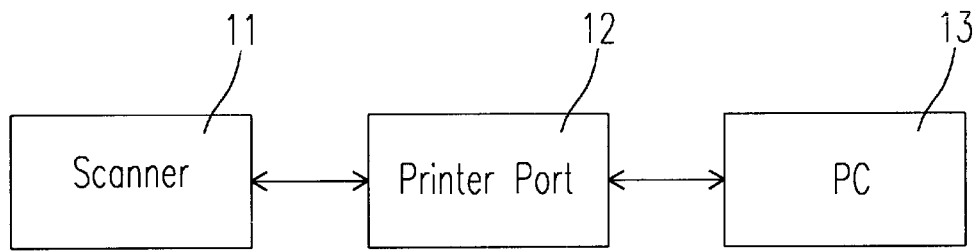
FIG. 1 schematically shows a block diagram of a conventional scanner connected with a PC by a printer port.
Figure 2:
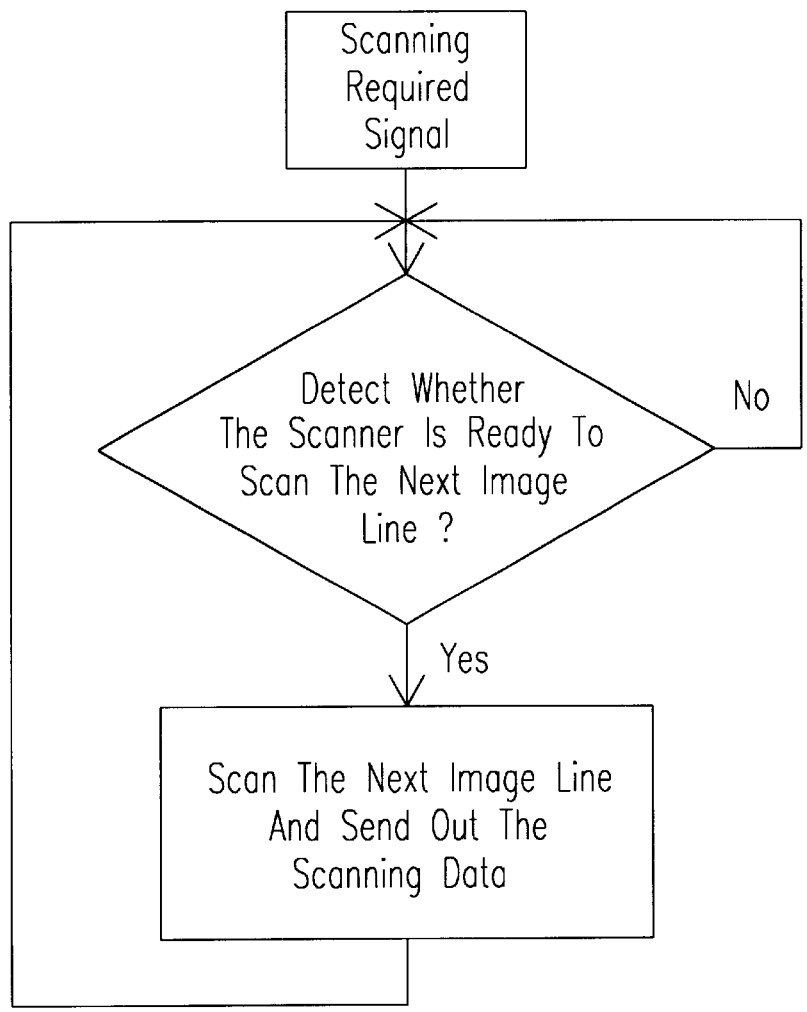
FIG. 2 schematically shows a flowchart of the scanning process of a conventional scanner connected with the PC through the printer port.
Figure 3:
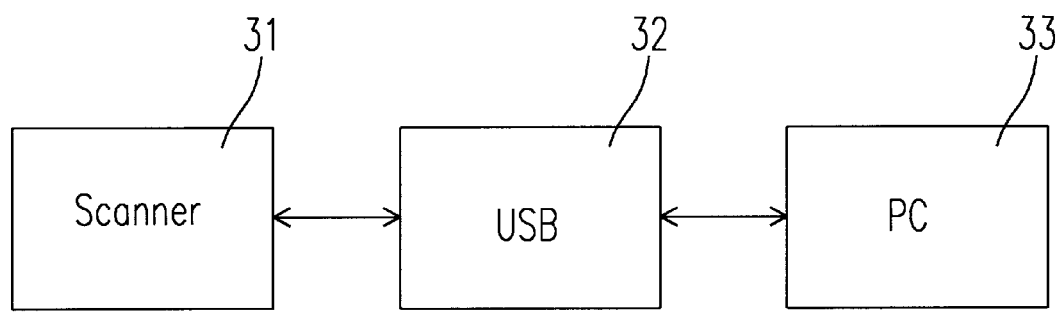
FIG. 3 schematically shows a block diagram of a conventional scanner, in conformity with USB standard, connected with a PC by a USB.
Figure 4:
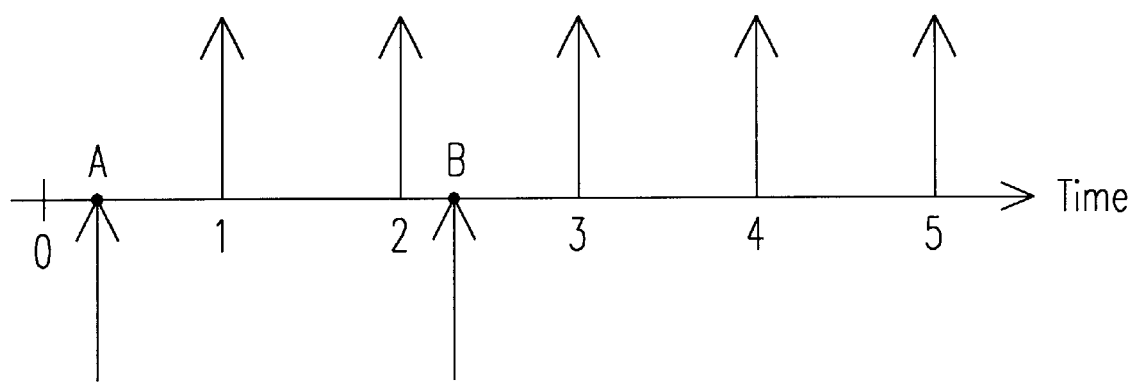
FIG. 4 schematically shows a timing diagram of the signal transmission of a conventional scanner, in conformity with the USB standard, connected with the PC through the USB.
Figure 5:
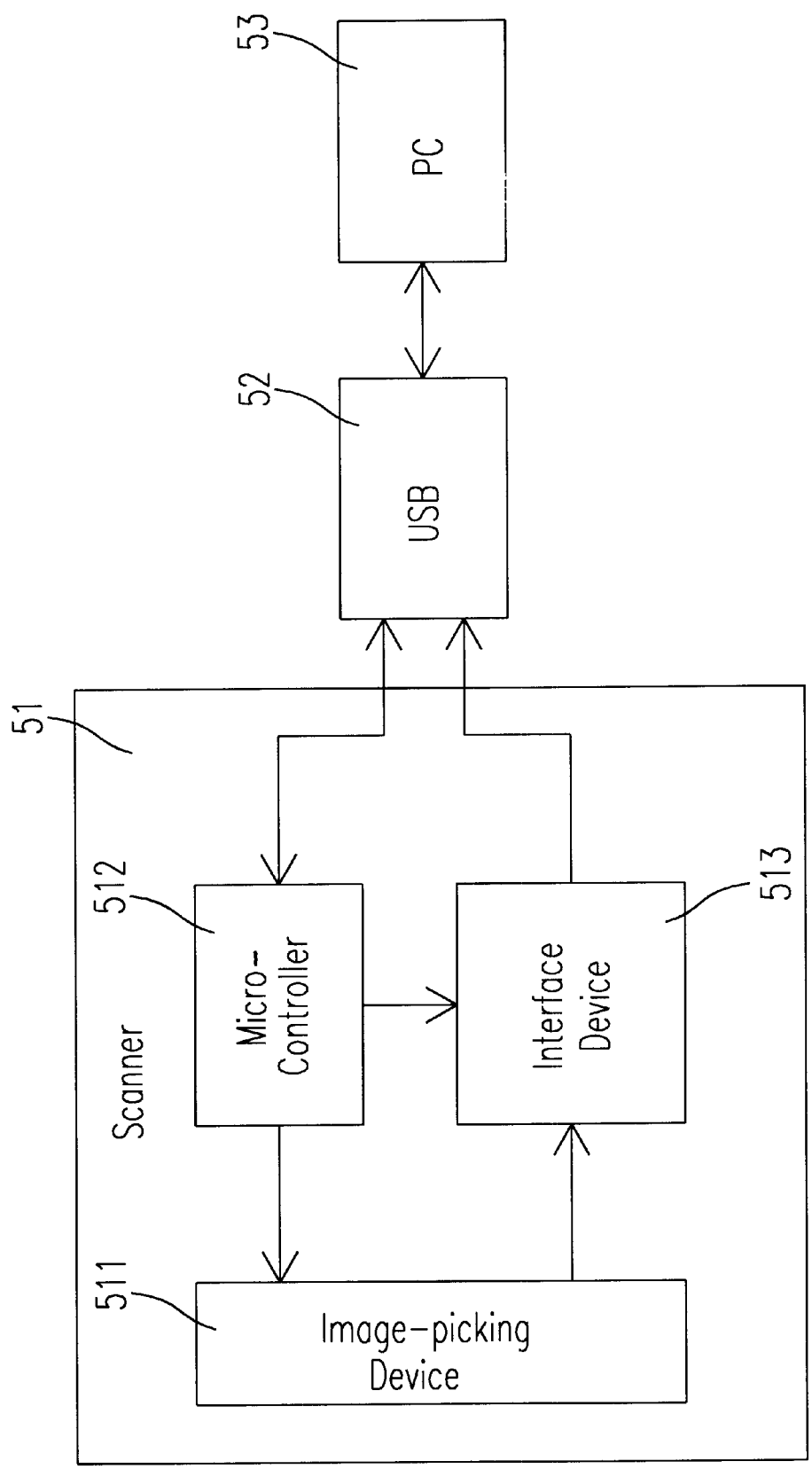
FIG. 5 schematically shows a block diagram of a preferred embodiment according to the present invention.

Please refer to FIG. 5 showing a preferred embodiment according to the present invention. The scanner is connected with the PC 53 by the universal serial bus (USB) 52. When the PC 53 sends a scanning required signal to the scanner 51 through the USB 52, the image-picking device 511 will execute the scanning process. During the scanning process, the microcontroller 512 is continuously detecting whether the image-picking device 511 is ready to scan the second image line after the first image line is scanned. If the image-picking device 511 is not ready, the microcontroller 512 keeps detecting. If the image-picking device 511 is ready, the microcontroller 512 sends out the scanning data to the PC 53 through the USB 52 and the second image line is scanned.

According to the above description, the present invention utilize the microcontroller 512 to detect whether the image-picking device 511 is ready or not, but not through the USB 52. The USB is only used for sending the scanning data to the PC 53. Therefore, the scanning process will not be delayed by the USB 52. By using the microcontroller installed in the scanner to detect whether the image-picking device is ready to scan and using the USB only to send the data, a scanner can scan an object faster according to the present invention.

The scanner further includes an interface device 513 which is electrically connected to the image-picking device

511. The interface device can receive the scanning data sent out by the image-picking device 511 and transmit it to the PC 53 through the USB 52. The task of the interface device 513 can be achieved by the 80930AD IC which is produced by Intel.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner with a built-in microcontroller to decrease the delay of transmission comprising:

an image-picking device for picking digital data of a plurality of image lines;

a microcontroller electrically directly connected to said image-picking device for continuously detecting whether said image-picking device is ready to scan a second image line after a first image line is picked, and for sending out digital data which have been picked, and if said image-picking device is not ready, said microcontroller causing said digital data to wait for said image-picking device to be ready; and an interface device electrically directly connected to said image-picking device and a universal serial bus (USB) for receiving said digital data sent out by said image-picking device and transmitting said digital data to a data processing device through said USB.

2. A scanner according to claim 1 wherein said image-picking device is a charge-coupled device (CCD).

3. A scanner according to claim 1 wherein said data processing device is a personal computer (PC).

* * * * *